Aug. 14, 1956    E. D. LOZANO    2,758,588
SINK MOUNTED COOKING VESSEL
Filed Sept. 21, 1954    2 Sheets-Sheet 1
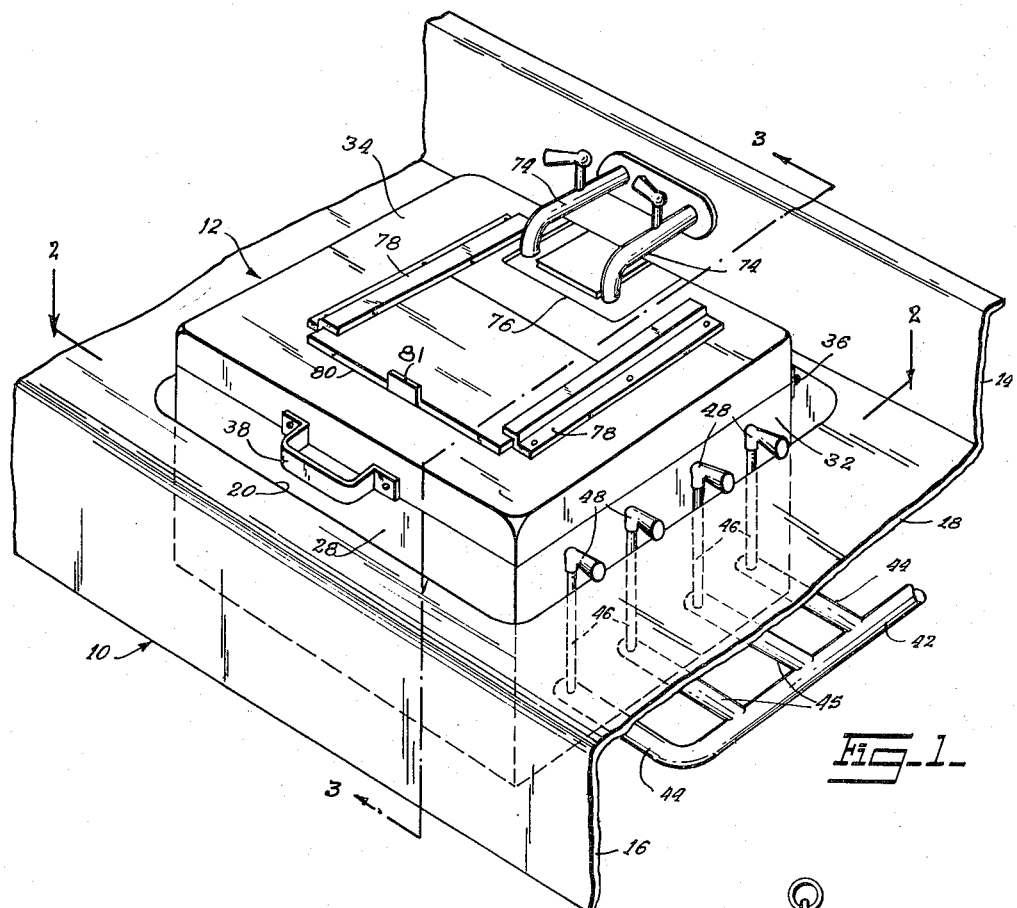
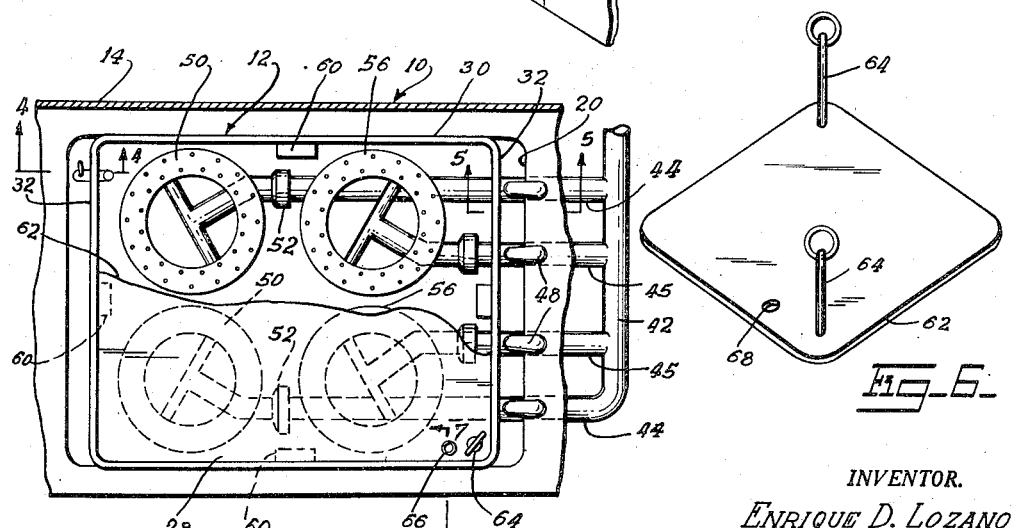
INVENTOR.
ENRIQUE D. LOZANO
BY
ATTORNEY Aug. 14, 1956 — E. D. LOZANO — 2,758,588
SINK MOUNTED COOKING VESSEL
Filed Sept. 21, 1954 — 2 Sheets-Sheet 2
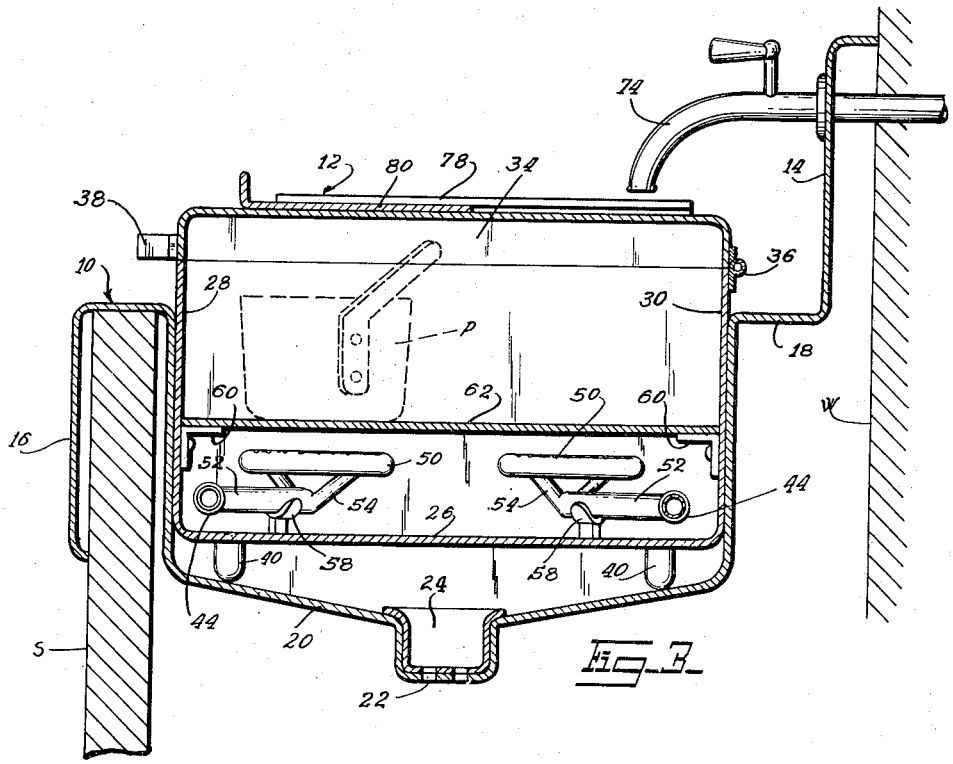
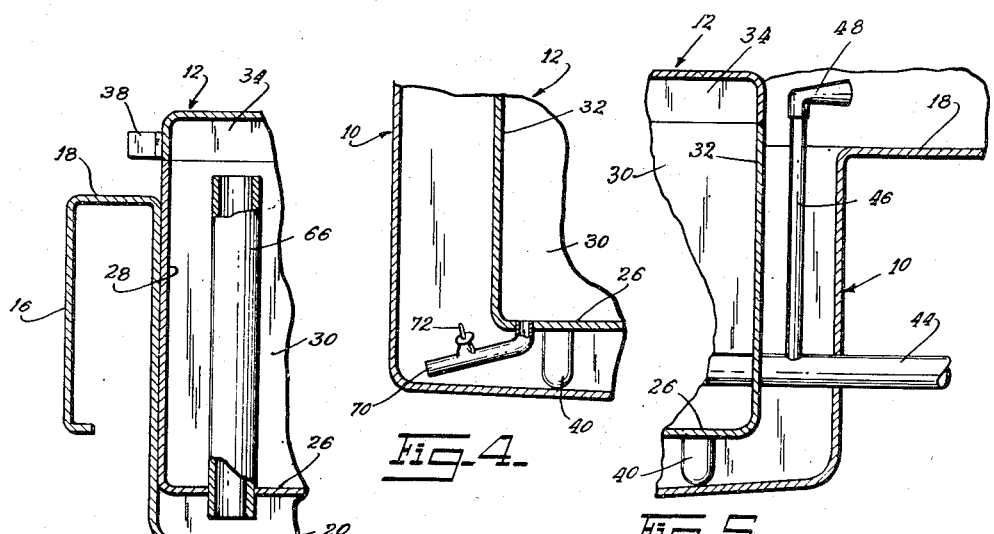
INVENTOR.
ENRIQUE D. LOZANO
BY
ATTORNEY 2,758,588
Patented Aug. 14, 1956

2,758,588
SINK MOUNTED COOKING VESSEL

Enrique D. Lozano, New York, N. Y.

Application September 21, 1954, Serial No. 457,466

15 Claims. (Cl. 126—1)

This invention relates to a cooker adapted to be mounted in a conventional sink. More particularly, the invention relates to a vessel of substantial size which can be installed permanently in a sink in a position to facilitate washing of the vessel after each use, and to permit filling of the vessel with water directly from the sink faucets.

Among important objects of the invention are the following:

First, to permit foods to be cooked without moving the vessel from its position in the sink beneath the faucets.

Second, to provide means selectively adjustable to vent the cooker at the top to any extent desired.

Third, to permit said means to serve also as a device for providing an opening below the sink faucets, into which opening water can drip slowly to preserve the coloring of vegetables being cooked, and otherwise improve upon the cooking operation.

Fourth, to facilitate the cleaning of the vessel after use.

Fifth, to permit the application of a controlled amount of heat to the food being cooked.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of a sink in which the cooking vessel has been mounted.

Fig. 2 is a plan sectional view on line 2—2 of Fig. 1, the pan support plate being partly broken away.

Fig. 3 is a transverse sectional view on line 3—3 of Fig. 1.

Fig. 4 is an enlarged detail view of the drain means, taken on line 4—4 of Fig. 2.

Fig. 5 is an enlarged detail sectional view on line 5—5 of Fig. 2 showing the gas control valve means.

Fig. 6 is a perspective view of the pan support plate per se.

Fig. 7 is a detail sectional view on line 7—7 of Fig. 2 showing the overflow pipe.

A conventional sink 10 is illustrated in association with the cooker 12 constituting the present invention, and includes an upstanding back plate 14 having at its upper edge a rearwardly directed flange engaging against the room wall W. Back plate 14 merges at its lower edge into a table portion 18 integral along its front edge with a depending apron 16, and supported upon a support wall S. Table portion 18 is formed with a recessed sink depression 20 having a bottom sloping to a depressed drain 22 in which fits a drain plug 24.

The cooker 12 comprises a rectangular container having a bottom wall 26, a front wall 28 in contact with the front wall of the sink depression 20, a back wall 30 in contact with the back wall of said depression, and side walls 32 spaced inwardly a short distance from the respective side walls of said depression. A cover 34 has a depending peripheral flange, and is hinged along its back to the back wall 30. Supporting the horizontal bottom wall 26 in spaced relation to the sink bottom are feet 40 depending from the corners of the bottom wall.

A main gas line or manifold 42 below the table portion 18 has a plurality of branches 44, 45 extending therefrom through openings formed in one side wall of the sink. Branches 44, 45, are extended, in parallelism, through openings in one of the side walls of the sink. In the space between the apertured walls of the sink and cooker, vertically extending, elongated valve stems 46 project upwardly from the branches and are fitted at their upper ends with handles 48 adapted to be grasped by a user for rotating the stems, thus to operate valves, not shown, within the branches. The valves would be of the conventional type operable to regulate the quantity of a combustible gas-air mixture allowed to flow into the cooker.

The branches 44, within the cooker, are elongated to extend close to the other side of the cooker, and at their outlet ends are connected to ring-type burner heads 50 to which the mixture is supplied through inlet conduits 52 having belled ends removably engaging about the discharge ends of the branches 44. Branch inlets 54 diverge in an upward direction from the inlet conduits and communicate at their divergent ends with the burner heads.

The branches 45 are substantially shorter than the branches 44 and supply fuel to burners 56 identical to burners 50 but formed oppositely to said burners 50. Supporting all the burners and their associated branches above bottom wall 26 are Y-shaped brackets 58 mounted on the bottom wall.

A rectangular plate 62 having a high thermal conductivity rating is supported immediately above the burners by brackets 60 fixed to the walls of the container, and is in contact throughout its periphery with the container wall. Plate 62 is adapted to support a pan P or other cooking vessel. To facilitate insertion or removal of the plate, diagonally opposed, upstanding lifting rods 64 are mounted thereon, and have ring handles at their upper ends conveniently disposed to be grasped by a user.

Under some circumstances, the container may itself become filled with water accidentally and, accordingly, an overflow pipe 66 projects upwardly through an opening 68 in one corner of the plate 62. Pipe 66 opens at its lower end through the bottom wall 26 and at its upper end terminates in closely spaced relation to the cover.

The cooking vessel may be washed in place, by removing plate 62 and burners 50, 56, and capping the branches 44, 45 by suitably shaped caps. When the container has been completely washed, a drainpipe 70 thereon permits the water to be drained out. A valve 72 controls the opening of the drainpipe.

The cooking vessel is mounted in the sink directly in the path of water flowing from faucets 74 of the sink. The cover 34 is, accordingly, formed with a U-shaped opening 76 so located and proportioned as to permit the cover to be swung to open position without engaging the faucets, said faucets and their handles moving through the legs and bight portion, respectively, of the cover when the cover is swung open in this manner. When the cover is closed, water from the faucets can flow through opening 76 into the container. Thus, it is possible to permit water to slowly drip into pans supported within the container, while foods are being cooked in said pans. The water thus can replace water boiled off as steam during the cooking process, thus to preserve the coloring and flavor of the foods.

The opening 76 can be either closed completely, or opened to a selected extent. For this purpose, the cover has parallel guide bars 78 arranged with the opening between them. The bars 78 are fixed to the cover and have upwardly offset inner edge portions below which are slidably engaged, the opposite side edges of a closure plate 80 having an upstanding ear 81 at one end providing a handle. Plate 80 can be adjusted slidably to completely close the opening 76. Or, the opening 76 can be uncovered slightly to an extent sufficient to permit the escape of steam while still preventing water from dripping from the faucets into the container. Any of various adjusted positions of the closure plate may thus be readily selected.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein.

2. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, means removably mounted in the container for supporting a plurality of cooking vessels therein, and feet depending from the container for supporting said container, above the bottom of the sink to facilitate drainage of liquids from the container and sink.

3. In a cooker the combination, with a sink having a pair of faucets, of a container mounted in the sink, means for supplying heat to the interior of said container, valved and overflow drains within the container arranged for drainage off liquids into the sink, a cover for the container having an opening disposed below the sink faucets, means for controlling the size of said opening and for closing the same, means removably mounted in the container for supporting a plurality of cooking vessels therein, and feet depending from the container for supporting said container, above the bottom of the sink to facilitate drainage of liquids from the container and sink, the container having its front and back walls in contact with the corresponding walls of the sink, and having its side walls spaced inwardly from the respective side walls of the sink.

4. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, means removably mounted in the container for supporting a plurality of cooking vessels therein, and feet depending from the container for supporting said container, above the bottom of the sink to facilitate drainage of liquids from the container and sink, the container having its front and back walls in contact with the corresponding walls of the sink, and having its side walls spaced inwardly from the respective side walls of the sink, said heat-supplying means including a plurality of gas supply pipes extending across one of the spaces defined between the container and sink side walls, and burner heads carried by said pipes within the container.

5. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, means removably mounted in the container for supporting a plurality of cooking vessels therein, and feet depending from the container for supporting said container, above the bottom of the sink to facilitate drainage of liquids from the container and sink, the container having its front and back walls in contact with the corresponding walls of the sink, and having its side walls spaced inwardly from the respective side walls of the sink, said heat-supplying means including a plurality of gas supply pipes extending across one of the spaces defined between the container and sink side walls, and burner heads carried by said pipes within the container, the heat-supplying means further including valves having stems extending upwardly within said one space to locations readily accessible to a user.

6. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, means removably mounted in the container for supporting a plurality of cooking vessels therein, and feet depending from the container for supporting said container, above the bottom of the sink to facilitate drainage of liquids from the container and sink, the container having its front and back walls in contact with the corresponding walls of the sink, and having its side walls spaced inwardly from the respective side walls of the sink, said heat-supplying means including a plurality of gas supply pipes extending across one of the spaces defined between the container and sink side walls, and burner heads carried by said pipes within the container, the heat-supplying means further including valves having stems extending upwardly within said one space to locations readily accessible to a user, said burner heads each including an annular burner outlet portion, a burner inlet pipe removably connected to the associated gas supply pipe, and upwardly diverging branch inlet pipes communicating between the branch inlet pipe and annular outlet portion.

7. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said openings and for closing the same, and means removably mounted in the container for supporting a plurality of cooking vessels therein, said valved drain including a drainpipe opening through the bottom of the container into said sink and a manually controlled valve carried by said drainpipe.

8. In a cooker the combination, with a sink having a pair of faucets, of a container mounted in the sink, means for supplying heat to the interior of said container, valved and overflow drains within the container arranged for draining off liquids into the sink, a cover for the container having an opening below the sink faucets, means for controlling the size of said opening and for closing the same, and means removably mounted in the container for supporting a plurality of cooking vessels therein, said overflow drain comprising an upstanding pipe within the container having its lower end opening through the bottom of the container and having its upper end terminating adjacent the upper end of the container.

9. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein, said cover being hinged to the container to swing upwardly to an open position.

10. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein, said cover being hinged to the container to swing upwardly to an open position, the opening of the cover receiving the sink faucets in the open cover position.

11. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein, said cover being hinged to the container to swing upwardly to an open position, the opening of the cover receiving the sink faucets in the open cover position, said opening being of U-shape with the bodies of the faucets moving through the leg portions of the U-shaped opening and the faucet handles moving through the bight portions thereof.

12. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein, said cover being hinged to the container to swing upwardly to an open position, the opening of the cover receiving the sink faucets in the open cover position, said opening being of U-shape with the bodies of the faucets moving through the leg portions of the U-shaped opening and the faucet handles moving through the bight portions thereof, the leg portions of the opening being disposed in the path of water flowing out of the faucets to permit water to be deposited in the container while the cover is in closed position.

13. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means removably mounted in the container for supporting a plurality of cooking vessels therein, said cover being hinged to the container to swing upwardly to an open position, the opening of the cover receiving the sink faucets in the open cover position, said opening being of U-shape with the bodies of the faucets moving through the leg portions of the U-shaped opening and the faucet handles moving through the bight portions thereof, the leg portions of the opening being disposed in the path of water flowing out of the faucets to permit water to be deposited in the container while the cover is in closed position, said means for controlling the size of the opening including a closure plate slidably mounted for movement into selected positions of adjustment over said opening to close, partially uncover, and fully uncover the same.

14. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means mounted in the container for supporting a plurality of cooking vessels therein, the last-named means comprising brackets carried by the walls of the container above the heat-supplying means, and a pan support plate removably supported by said brackets.

15. In a cooker the combination, with a sink having a pair of faucets, of a container mounted in the sink, means for supplying heat to the interior of said container, valved and overflow drains within the container arranged for draining off liquids into the sink, a cover for the container having an opening disposed below the sink faucets, means for controlling the size of said opening and for closing the same, and means mounted in the container for supporting a plurality of cooking vessels therein, the last-named means comprising brackets carried by the walls of the container above the heat-supplying means, and a pan support plate removably supported by said brackets, said plate including upstanding, diagonally opposed lifting rods having handles at their upper ends.

References Cited in the file of this patent

UNITED STATES PATENTS

| | | |
|---|---|---|
| 653,714 | Thurman | July 17, 1900 |
| 858,926 | Vanderman | July 2, 1907 |
| 2,102,616 | Ehret | Dec. 21, 1937 |